US012689566B2

(12) United States Patent
Liu

(10) Patent No.: US 12,689,566 B2
(45) Date of Patent: Jul. 21, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Yang Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 306 days.

(21) Appl. No.: 18/237,560

(22) Filed: Aug. 24, 2023

(65) Prior Publication Data

US 2023/0396521 A1     Dec. 7, 2023

Related U.S. Application Data

(63) Continuation of application No. PCT/CN2021/078717, filed on Mar. 2, 2021.

(51) Int. Cl.
*H04L 41/5067* (2022.01)
*H04W 24/08* (2009.01)
*H04W 24/10* (2009.01)

(52) U.S. Cl.
CPC ......... *H04L 41/5067* (2013.01); *H04W 24/08* (2013.01); *H04W 24/10* (2013.01)

(58) Field of Classification Search
CPC .... H04L 41/5067; H04W 24/08; H04W 24/10
See application file for complete search history.

(56) References Cited

U.S. PATENT DOCUMENTS

| | | | | | |
|---|---|---|---|---|---|
| 2012/0320766 A1* | 12/2012 | Sridhar | ................. | H04W 24/02 |
| | | | | 370/252 |
| 2020/0162949 A1* | 5/2020 | He | ....................... | H04L 41/5032 |
| 2022/0279385 A1* | 9/2022 | Johansson | ............. | H04W 24/04 |
| 2023/0319616 A1* | 10/2023 | Lunardi | ............ | H04W 28/0289 |
| | | | | 370/329 |
| 2024/0056872 A1* | 2/2024 | Parichehrehteroujeni | ................... | |
| | | | | H04L 41/0806 |

FOREIGN PATENT DOCUMENTS

| | | |
|---|---|---|
| CN | 103621134 A | 3/2014 |
| CN | 105357691 A | 2/2016 |
| CN | 108965949 A | 12/2018 |

(Continued)

OTHER PUBLICATIONS

Lunardi et al. "Methods for QoE Measurement Handling at Overload in RAN " U.S. Appl. No. 63/047,988 for Lunardi et al. U.S. Patent Publication 2023/0319616 (Year: 2020).*

(Continued)

*Primary Examiner* — Angela Widhalm De Rodriguez
(74) *Attorney, Agent, or Firm* — BAYES PLLC

(57) ABSTRACT

A wireless communication method is applied to a terminal device supporting the collection of a QoE measurement value corresponding to at least one service type, and includes: receiving indication information sent by a network device; and based on the indication information, suspending the collection of, suspending reporting of, resuming the collection of, or resuming the reporting of the QoE measurand corresponding to the at least one service type.

15 Claims, 3 Drawing Sheets

300

Terminal Device

Network Device

S310, at least one configuration information, where the at least one configuration information is used for configuring information required for collection and/or reporting of QoE measurand corresponding to at least one service type supported by the terminal device

(56) References Cited

FOREIGN PATENT DOCUMENTS

WO       2019010606  A1     1/2019
WO       2021028397  A1     2/2021

OTHER PUBLICATIONS

Extended European Search Report issued in corresponding European application No. 21928466.8, mailed Feb. 21, 2024.
Source: Qualcomm Incorporated; Title: Handling of NR QoE reporting; R2-2101339 3GPP TSG-RAN WG2 Meeting #113-e Electronic, Jan. 25-Feb. 5, 2021.
Source: Qualcomm Inc.; Title: QoE report suspending in RAN overload and RRC_IDLE/INACTIVE; R3-210355 3GPP TSG-RAN WG3 Meeting #111e E-Meeting: Jan. 25-Feb. 4, 2021.
Ericsson, "QoE management solution description", S5-171111, 3GPP TSG SA WG5 (Telecom Management) Meeting #111 Jan. 16-20, 2017, Porto (Portugal).
Ericsson, "QoE management solution description", S5-171363, 3GPP TSG SA WG5 (Telecom Management) Meeting #111 Jan. 16-20, 2017, Porto (Portugal).
International Search Report issued in international application No. PCT/CN2021/078717, mailed Jun. 17, 2022.
Written Opinion of the International Searching Authority issued in international application No. PCT/CN2021/078717, mailed Sep. 30, 2021.
3GPP TS 36.331 V16.1.1 (Jul. 2020); Technical Specification Group Radio Access Network; Evolved Universal Terrestrial Radio Access (E-UTRA); Radio Resource Control (RRC); Protocol specification (Release 16).

* cited by examiner

300
| Terminal Device | | Network Device |
S310, at least one configuration information, where the at least one configuration information is used for configuring information required for collection and/or reporting of QoE measurand corresponding to at least one service type supported by the terminal device
FIG. 3
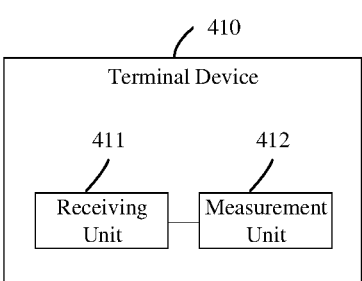
FIG. 4
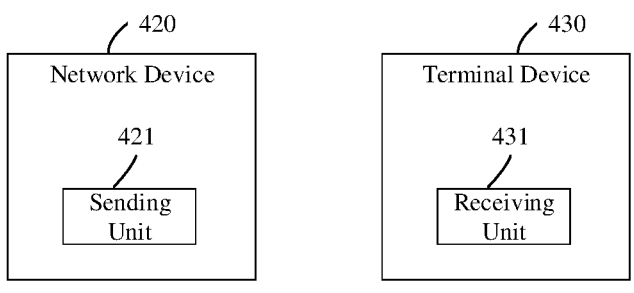
FIG. 5          FIG. 6
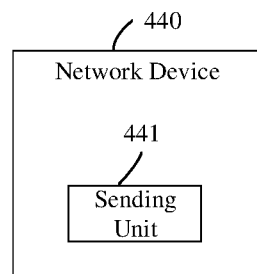
FIG. 7

500

600

WIRELESS COMMUNICATION METHOD, TERMINAL DEVICE AND NETWORK DEVICE

CROSS-REFERENCE TO RELATED APPLICATION

This application is a continuation of International Application No. PCT/CN2021/078717, filed Mar. 2, 2021, which is incorporated herein by reference in its entirety.

TECHNICAL FIELD

Embodiments of this application relate to the field of communications, and more particularly, to wireless communications, terminal devices, and network devices.

BACKGROUND

In the long term evolution (LTE), a terminal device may support collection and reporting of an experience (QoE) measurand corresponding to only one service type at the same time in a certain period of time. QoE refers to the user's subjective perception of the quality and performance of devices, network and systems, applications or services. QoE also refers to the difficulty level, perceived by the user, of completing the entire process.

However, with the improvement of the terminal device's own capabilities and increasing demand for simultaneous processing of multiple services, the collection scheme for QoE measurand in LTE may no longer meet the requirements of the fifth-generation mobile communication (5-Generation, 5G) new radio (NR) technology.

Therefore, there is an urgent need in the art for a collection scheme for QoE measurand that can support 5G NR.

SUMMARY

Embodiments of this application provide wireless communications, terminal devices, and network devices, which can be used as a collection scheme for QoE measurand that can support 5G NR. Specifically, the network air interface resource overhead can be saved while improving the flexibility of reporting QoE measurand corresponding to service types.

According to a first aspect, embodiments of this application provide a wireless communication method. The method is applied to a terminal device, where the terminal device supports collection of QoE measurand corresponding to at least one service type, and the method includes:

receiving indication information sent by a network device; and based on the indication information, suspending the collection of, suspending reporting of, resuming the collection of, or resuming the reporting of the QoE measurand corresponding to the at least one service type According to a second aspect, embodiments of this application provide a wireless communication method. The method is applied to a network device and includes:

sending indication information to a terminal device, where the indication information is configured for the terminal device to suspend collection of, suspend reporting of, resume the collection of, or resume the reporting of QoE measurand corresponding to at least one service type.

According to a third aspect, embodiments of this application provide a wireless communication method, including:

receiving at least one configuration information sent by a network device, wherein the at least one configuration information is used for configuring information required for collection and/or reporting of QoE measurand corresponding to at least one service type supported by a terminal device.

According to a fourth aspect, embodiments of this application provide a wireless communication method, including:

sending at least one configuration information to a terminal device, wherein the at least one configuration information is used for configuring information required for collection and/or reporting of QoE measurand corresponding to at least one service type supported by the terminal device.

According to a fifth aspect, a communication device is provided, which is configured to implement the method according to any one of the forgoing first to fourth aspects or any embodiment thereof. Specifically, it includes functional modules for implementing the method according to any of the embodiments of the first to the fourth aspects.

According to some embodiments, the communication device may include a sending unit and/or a receiving unit. The sending unit is configured to implement functions related to transmission, and the receiving unit is configured to implement functions related to reception. For example, the sending unit may be a transmitting device or a transmitter, and the receiving unit may be a receiving device or a receiver. For another example, the communication device is a communication chip, the receiving unit may be an input circuit or an input interface of the communication chip, and the sending unit may be an output circuit or an output interface of the communication chip.

According to some embodiments, the communication device is a terminal device, or the communication device is a network device. The terminal device is configured to implement the method according to the first aspect, the third aspect, or any embodiment of the first and the third aspects. The network device is configured to implement the method according to the second aspect, the fourth aspect, or any embodiment of the second and the fourth aspects.

According to a sixth aspect, a communication device is provided, which is configured to implement the method according to any one of the forgoing first to fourth aspects or any embodiment thereof. Specifically, it includes a processor and a memory, the memory is configured to store a computer program, and the processor is configured to invoke and execute the computer program from the memory, thereby causing the communication device to implement the method according to any one of the forgoing first to fourth aspects or any embodiment thereof.

According to some embodiments, the processor includes one or more processors and the memory includes one or more memories.

According to some embodiments, the memory may be integrated with the processor, or the memory may be provided separately from the processor.

According to some embodiments, the communication device further includes a transmitting device (transmitter) and a receiving device (receiver).

According to some embodiments, the communication device is a terminal device, or the communication device is a network device. The terminal device is configured to implement the method according to the first aspect, the third aspect, or any embodiment of the first and the third aspects. The network device is configured to implement the method according to the second aspect, the fourth aspect, or any embodiment of the second and the fourth aspects.

According to a seventh aspect, a system is provided and includes the forgoing terminal device and network device.

According to an eighth aspect, a chip is provided and configured to implement the method according to any one of the forgoing first to fourth aspects or any embodiment thereof. Specifically, the chip includes a processor configured to invoke and execute a computer program from a memory, thereby causing the device installed with the chip to implement the method according to any one of the forgoing first to fourth aspects or any embodiment thereof.

According to a ninth aspect, a computer-readable storage medium is provided for storing a computer program, where the computer program causes a computer to implement the method according to any one of the forgoing first to fourth aspects or any embodiment thereof.

According to a tenth aspect, a computer program product is provided and includes computer program instructions, where the computer program instructions cause a computer to implement the method according to any one of the forgoing first to fourth aspects or any embodiment thereof.

According to an eleventh aspect, there is provided a computer program which, when running on a computer, causes the computer to implement the method according to any one of the forgoing first to fourth aspects or any embodiment thereof.

In some embodiments of this application, based on the indication information sent by the network device, it is to suspend the collection, suspend the reporting, resume the collection, or resume the reporting of the QoE measurand corresponding to the at least one service type. On the one hand, collection and/or reporting of QoE measurand corresponding to one or more service types can be supported simultaneously, thereby further supporting the collection and/or reporting of QoE measurand in 5G NR. On the other hand, due to the shortage of air interface transmission resources, as to the collection and/or reporting of QoE measurand, the network device is designed to have the ability to suspend the measurand collection and/or reporting of the terminal; and after the usage of network air interface transmission resources becomes better, the collection and/or reporting of the QoE measurand can be resumed. In view of above, the network device can flexibly designate the terminal to suspend or resume the collection and/or reporting of QoE measurand corresponding to at least a certain type of service or all types of services, so as to reduce network air interface resource overhead.

In summary, suspending collection of, suspending reporting of, resuming collection of, or resuming reporting of QoE measurand corresponding to at least one service type is performed based on the indication information sent by the network device, thereby saving the network air interface resource overhead while improving the reporting flexibility of QoE measurand corresponding to the service type.

BRIEF DESCRIPTION OF THE DRAWINGS

FIG. 2 and FIG. 3 are schematic flowcharts of a wireless communication method according to some embodiments of this application.

FIG. 4 is a schematic block diagram of a terminal device according to some embodiments of this application.

FIG. 5 is a schematic block diagram of a network device according to some embodiments of this application.

FIG. 6 is another schematic block diagram of a terminal device according to some embodiments of this application.

FIG. 7 is another schematic block diagram of a network device according to some embodiments of this application.

DETAILED DESCRIPTION

The technical solutions in some embodiments of this application will be described below with reference to the accompanying drawings according to some embodiments of this application. Obviously, the described embodiments are part of embodiments of this application, not all of them. Based on the embodiments in this application, all other embodiments obtained by those of ordinary skill in the art without creative efforts shall fall within the protection scope of this application.

Figure 1:
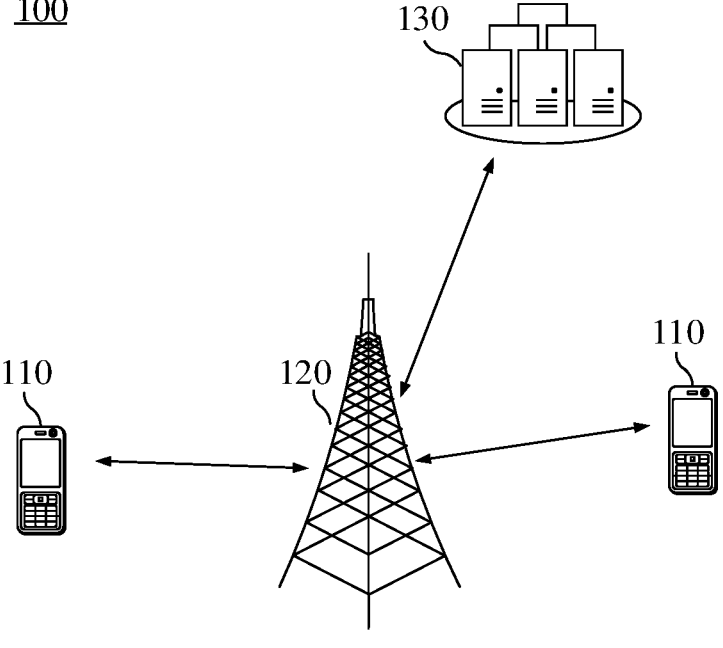
FIG. 1 is a schematic diagram of an application scenario according to some embodiments of this application.

FIG. 1 is a schematic diagram of an application scenario according to some embodiments of this application.

As shown in FIG. 1, a communication system 100 may include a terminal device 110 and a network device 120. The network device 120 may communicate with the terminal device 110 through an air interface. Multi-service transmission is supported between the terminal device 110 and the network device 120.

It should be understood that some embodiments of this application only use the communication system 100 for exemplary description, but the embodiments of this application are not limited thereto. In other words, the technical solutions according to some embodiments of this application may be applied to various communication systems, for example, LTE system, LTE time division duplex (TDD), universal mobile communication system (UMTS), 5G communication system (also known as NR communication system), future communication systems, or the like.

In the communication system 100 shown in FIG. 1, the network device 120 may be an access network device that communicates with the terminal device 110. The access network device may provide communication coverage for a particular geographic area, and may communicate with terminal devices 110 (e.g., UEs) located within the coverage area.

The network device 120 may be an evolutional Node B (eNB or eNodeB) in the LTE system, or a next generation radio access network (NG RAN) device, or a base station (gNB) in the NR system, or a wireless controller in a cloud radio access network (CRAN). Alternatively, the network device 120 may be a relay station, an access point, a vehicle-mounted device, a wearable device, a hub, a switch, a bridge, a router, or a network device in the future-evolved public land mobile network (PLMN).

The terminal device 110 may be any terminal device, which includes, but is not limited to, a terminal device that adopts a wired or wireless connection with the network device 120 or other terminal devices.

For example, the terminal device 110 may refer to an access terminal, a user equipment (UE), a subscriber unit, a subscriber station, a mobile site, a mobile station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), or a handheld device, a computing device with wireless communication function, or other processing devices connected to wireless modems, in-vehicle devices, wearable devices, end devices in 5G networks or end devices in future evolved networks, or the like.

The terminal device 110 may be used for device-to-device (D2D) communication.

The wireless communication system 100 may further include a core network device 130 that communicates with the base station, and the core network device 130 may be a 5G core network (5G Core, 5GC) device; for example, an access and mobility management function (AMF); for another example, an authentication server function (AUSF); for another example, a user plane function (UPF); for still another example, a session management function (SMF). Optionally, the core network device 130 may also be an evolved packet core (EPC) device of the LTE network, for example, a session management function+core packet gateway (SMF+PGW-C) device. It should be understood that the SMF+PGW-C may simultaneously implement the functions that the SMF and the PGW-C can implement. In the process of network evolution, the forgoing core network devices may also be called by other names, or a new network entity may be formed by dividing the functions of the core network, which is not limited in embodiments of this application.

The various functional units in the communication system 100 may also establish a connection through a next generation (NG) network interface to implement communication.

For example, the terminal device establishes an air interface connection with the access network device through the NR interface, so as to transmit user plane data and control plane signaling. The terminal device may establish a control plane signaling connection with the AMF through the NG interface 1 (N1 for short). The access network device, such as the next generation wireless access base station (gNB), may establish a user plane data connection with the UPF through the NG interface 3 (N3 for short). The access network device may establish a control plane signaling connection with the AMF through the NG interface 2 (N2 for short). UPF may establish a control plane signaling connection with SMF through NG interface 4 (N4 for short). UPF may exchange user plane data with the data network through NG interface 6 (N6 for short). AMF may establish a control plane signaling connection with SMF through NG interface 11 (N11 for short). SMF may establish a control plane signaling connection with PCF through the NG interface 7 (N7 for short).

FIG. 1 exemplarily shows one base station, one core network device and two terminal devices. Optionally, the wireless communication system 100 may include multiple base station devices and the coverage area of each base station may include other numbers of terminal devices, which is not limited in embodiments of this application.

It should be understood that, in some embodiments of this application, a device having a communication function in the network/system may be referred to as a communication device. Taking the communication system 100 shown in FIG. 1 as an example, the communication device may include the network device 120 and the terminal device 110 with the communication function, and the network device 120 and the terminal device 110 may be the devices as described above, which will not be repeated here. The communication device may further include other devices in the communication system 100, such as other network entities such as a network controller and a mobility management entity, which are not limited in embodiments of this application.

It should be understood that the terms "system" and "network" are often used interchangeably herein. The term "and/or" in this article is only used for describing an association relationship of associated objects, indicating that there may be three kinds of relationships. For example, A and/or B may mean following three cases: A exists alone, both A and B exist, and B exist alone. In addition, the character "/" in this document generally indicates that the related objects are in an "or" relationship.

In LTE, a terminal device may support collection and reporting of an experience (QoE) measurand corresponding to only one service type at the same time in a certain period of time. QoE refers to the user's subjective perception of the quality and performance of devices, network and systems, applications or services. QoE also refers to the difficulty level, perceived by the user, of completing the entire process.

QoE refers to the user's subjective perception of the quality and performance of devices, network and systems, applications or services. QoE also refers to the difficulty level, perceived by the user, of completing the entire process. ITU-T Rec E.800 originally defined QoS as "the combined effect of service performance that determines user satisfaction". From the definition, it is very eloquent and abstract. Specifically, QoS may be narrowly understood as the KPI performance index of the underlying packet data transmission. These parameters include network delay, jitter, bandwidth, bit errors and other indicators. From the network device level, it is easy to monitor and count, and the KPI objectively reflects the performance of the device. The International Telecommunication Union defines QoE as the subjective acceptability of an application or service as a whole by end users. In other words, QoE is defined as the overall performance of a system as experienced from the user's perspective. QoE is a subjective feeling, that is, a subjective feeling of the service generated by the user in the process of interacting with the service or application. Therefore, QoE has two direct impact factors users and services. However, the process of interaction between users and services will definitely be in a certain objective environment, and the objective environment has a greater impact on the interaction process between users and services. Therefore, this application defines QoE as: the overall recognition degree of the service or service used by the user in a certain objective environment.

The influencing factors of QoE may be divided into three levels, namely the service level, the environment level and the user level. The influencing factors of the service layer further include parameters of the network (or transport) layer, the application layer and the service layer. The parameters of the transport layer reflect the status of network transmission, such as delay, bandwidth, packet loss rate, bit error rate, jitter and the like. The parameters of the application layer reflect the performance of the service that has not been transmitted, including the influence of the session layer, presentation layer, and application layer in the OSI model on the service, such as content resolution, codec type, and the like in the IPTV service. The parameters of the service layer determine the semantics, content, priority, importance and pricing of the communication, such as the configuration of the service layer (type of content, application level of the service) and quality assurance. The influencing factors at the environmental level include the natural environment (such as light conditions, noise levels, stationary or moving environments), human and social environments (such as social concepts, cultural norms), and service operating environments (including hardware and software environments). User-level factors may include the user's expectations, experience, physical and mental state and background (such as age, gender, education level, values, and the like) of the user during his/her experience.

The purpose of QoE collection and reporting is for a specific application, and the network configures the terminal to report measurand related to the user experience of the application, such as at least one of the following:

Average Throughput;

Initial Playout Delay;

Buffer Level; and

Device information.

The network device configures the terminal device with a QoE collection configuration for the collection of QoE measurand.

In LTE, when sending the QoE collection configuration to a qualified terminal device, the network device may use the RRCConnectionReconfiguration signaling to send the QoE measurement configuration to the terminal device, where the otherConfig IE in the RRCConnectionReconfiguration IE may contain the QoE measurement configuration, and the QoE measurement configuration includes the following information: service type and QoE measurement collection (QMC) configuration file. For example, the information included in the QMC configuration file may be the information stored in the r15 measurement configuration application layer container (measConfigAppLayerContainer-r15).

Specifically, the network device searches for a suitable terminal within a suitable geographic scope (areaScope) according to the evolved universal terrestrial radio access (E-UTRA) capability that supports QoE, that is, a terminal that meets the QoE collection conditions, and then sends the QMC configuration file to the searched terminal. When the terminal access stratum (AS) receives the signaling from the network device, the terminal AS layer sends the corresponding QoE configuration file to an appropriate application (APP) layer according to the Service Type IE. At the same time, the signaling radio bearers (SRB) 4 may need to be established between the network device and the terminal. After the measurement result of the APP layer is obtained by the AS, the measurement result is stored in the measurement configuration application layer container (measReportAppLayerContainer), and sent to the network device on the SRB4 through the bottom layer.

In LTE, a terminal can only support the collection of QoE measurand corresponding to only one service type at the same time in a certain period of time. Due to the improvement of the terminal's own capabilities and the increasing demand for simultaneous development of multiple services in 5G NR, the terminal may need to have the ability to simultaneously support the collection of QoE measurand corresponding to at least one service type in a certain period of time. However, with the improvement of the terminal device's own capabilities and the increasing demand for simultaneous multi-service development, the QoE measurand collection scheme in LTE can no longer meet the requirements of the fifth-generation mobile communication (5-Generation, 5G) new radio (NR) technology. Therefore, this application provides a collection scheme for QoE measurand that can support 5G NR.

Figure 2:
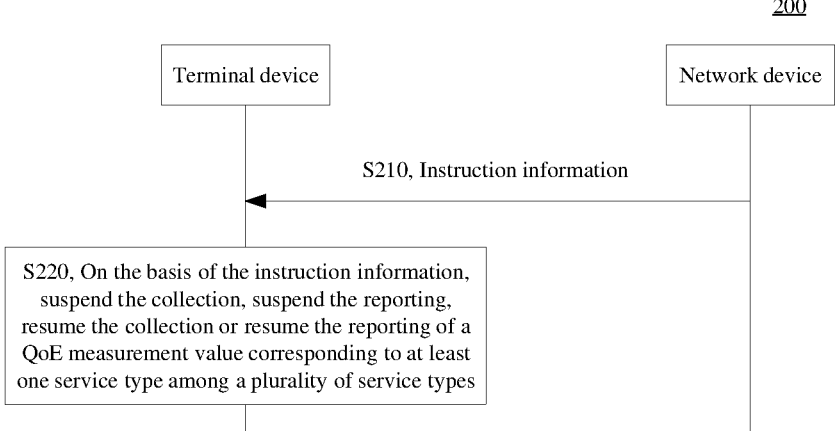

FIG. 2 is a schematic flowchart of a wireless communication method 200 according to some embodiments of this application. The method 200 may be implemented interactively by a terminal device and a network device. The terminal device shown in FIG. 2 may be the terminal device shown in FIG. 1, and the network device shown in FIG. 2 may be the access network device shown in FIG. 1. The terminal device shown in FIG. 2 supports the collection of QoE measurand corresponding to at least one service type.

As shown in FIG. 2, the method 200 may include following content.

In S210, indication information sent by the network device is received.

In S220, based on the indication information, suspending collection of, suspending reporting of, resuming the collection of, or resuming the reporting of the QoE measurand corresponding to the at least one service type is performed.

In short, the terminal device suspends the collection, suspends the reporting, resumes the collection, or resumes the reporting of the QoE measurand corresponding to the at least one service type based on the indication information sent by the network device.

In some embodiments of this application, based on the indication information sent by the network device, it is to suspend the collection, suspend the reporting, resume the collection, or resume the reporting of the QoE measurand corresponding to the at least one service type. On the one hand, collection and/or reporting of QoE measurand corresponding to one or more service types can be supported simultaneously, thereby further supporting the collection and/or reporting of QoE measurand in 5G NR. On the other hand, due to the shortage of air interface transmission resources, as to the collection and/or reporting of QoE measurand, the network device is designed to have the ability to suspend the measurand collection and/or reporting of the terminal; and after the usage of network air interface transmission resources becomes better, the collection and/or reporting of the QoE measurand can be resumed. In view of above, the network device can flexibly designate the terminal to suspend or resume the collection and/or reporting of QoE measurand corresponding to at least a certain type of service or all types of services, so as to reduce network air interface resource overhead.

In summary, suspending collection of, suspending reporting of, resuming collection of, or resuming reporting of QoE measurand corresponding to at least one service type is performed based on the indication information sent by the network device, thereby saving the network air interface resource overhead while improving the reporting flexibility of QoE measurand corresponding to the service type.

It should be noted that the term "indication" involved in the embodiments of this application may be a direct indication, an indirect indication, or an associated relationship. For example, if A indicates B, it may represent that A directly indicates B, e.g., B can be obtained through A; it may also represent that A indicates B indirectly, e.g., A indicates C, and B can be obtained through C; it may also represent that there is an association relation between A and B.

In some embodiments, the indication information is used for indicating a service type that needs suspending the collection of, suspending the reporting of, resuming the collection of, or resuming the reporting of the QoE measurand.

In other words, the indication information is used to explicitly inform the terminal of the service type that needs suspending or resuming of the QoE measurand collection, such as at least one of a Multimedia Broadcast Multicast Service (MBMS), a streaming media service, or Multimedia Telephony Services for IMS (MTSI). For example, "00" indicates that the collection and/or reporting of MBMS needs to be suspended, and "10" indicates that the collection and/or reporting of MBMS needs to be resumed. For another example, "01" indicates that the collection and/or reporting of the streaming media service needs to be suspended, and "11" indicates that the collection and/or reporting of the streaming media service needs to be resumed. Apparently, the embodiments of this application do not specifically limit the number of bits of the indication information.

In some embodiments, the indication information is carried in radio resource control (RRC) signaling.

In some embodiments, the indication information includes a first identifier, and the first identifier is used for indicating to suspend the collection and/or to suspend the reporting, or the first identifier is used for indicating to resume the collection and/or to resume the reporting.

In other words, the first identifier is only used for indicating at least one of suspending collection, suspending reporting, resuming collection or resuming reporting.

For example, the indication information is carried in first signaling, and the first identifier may be a bit carried in the first signaling. For example, a bit value of 0 indicates suspending the collection and/or reporting, and a bit value of 1 indicates resuming the collection and/or reporting. For another example, the first identifier may also be the title or name of the first signaling, which is not specifically limited in embodiments of this application.

In some embodiments, the indication information further includes related information of the at least one service type.

In other words, the terminal device determines an operation to be performed in suspending collection, suspending reporting, resuming collection, or resuming reporting based on the first identifier, and then, based on the related information of the at least one service type, performs the corresponding operation, such as suspending collection, suspending reporting, resuming collection, or resuming reporting, on the at least one service type.

In some embodiments, the related information of the at least one service type includes at least one index corresponding to the at least one service type.

Optionally, in other alternative embodiments, the related information of the at least one service type may also include the title or name of each service type in the at least one service type, which is not specifically limited in embodiments of this application. For example, the title of service type includes, but is not limited to, MBMS, streaming media service, or MTSI.

In some embodiments, the at least one index corresponding to the at least one service type is pre-configured or network-configured.

In other words, the terminal device determines an operation to be performed in suspending collection, suspending reporting, resuming collection, or resuming reporting based on the first identifier, and then based on the pre-configured or network-configured information related to the at least one service type (e.g., the index of each service type in the at least one service type), performs a corresponding operation, such as suspending collection, suspending reporting, resuming collection, or resuming reporting, on the at least one service type.

It should be noted that, in some embodiments of this application, the "pre-configured" may be achieved by pre-saving corresponding codes, tables, or by other manners that can be used for indicating related information in devices (e.g., including terminal devices and network devices), for which the specific implementation is not limited by this application. For example, the "preconfigured" may refer to being defined in the protocol. Optionally, the "protocol" may refer to a standard protocol in the communication field, for example, may include LTE protocol, NR protocol, and related protocols applied in future communication systems, which are not specifically limited in this application.

In some embodiments, the indication information is carried in an RRC signaling or a media access control (MAC) control element (CE).

In some embodiments, the indication information is a bitmap, and one bit in the bitmap corresponds to one service type in the at least one service type, or one bit in the bitmap corresponds to an index of one service type in the at least one service type.

In other words, the indication information indicates, through a bit in the bitmap, suspending collection, suspending reporting, resuming collection or resuming reporting of a service type corresponding to the bit. Alternatively, the indication information indicates, through a bit in the bitmap, suspending collection, suspending reporting, resuming collection or resuming reporting of a service type whose index corresponds to the bit.

In some embodiments, when a value of the one bit is a first value, the value of the one bit is used for indicating to suspend the collection and/or suspend the reporting of QoE measurand corresponding to the one service type; or, when a value of the indication information is a second value, the value of the one bit is used for indicating to resume the collection or resume the reporting of the QoE measurand corresponding to the one service type.

In other words, the network indicates through the bitmap the index number corresponding to the service type for which the terminal needs to suspend and/or resume the QoE measurand collection. For example, when the bit value corresponding to the index number in the bitmap is 1 or 0, it indicates suspending or resuming, respectively.

In some embodiments, when a value of the one bit is a first value, the value of the one bit is used for indicating to switch a collection state and/or a reporting state of the one service type; or, when the value of the one bit is a second value, the value of the one bit is used for indicating not to switch the collection state and/or the reporting state of the one service type.

In other words, the network indicates through the bitmap the index number corresponding to the service type for which the terminal needs to suspend/resume the QoE measurand collection. For example, when the bit value corresponding to the index number in the bitmap is 1 or 0, it indicates switching or not switching the collection state and/or reporting state of the service type, respectively.

In some embodiments, the bitmap includes a bit(s) corresponding to the at least one service type.

In some embodiments, the indication information is carried in an RRC signaling or a MAC CE.

In some embodiments, the indication information is used for indicating a first number of service types for which collection and/or reporting of the QoE measurand needs to be suspended, and/or the indication information is used for indicating a second number of service types for which collection and/or reporting of the QoE measurand needs to be resumed.

In other words, the terminal device determines, in the at least one service type, a service type that needs to suspend the collection and/or suspend the reporting of the QoE measurand based on the first number indicated by the indication information, and determines, in the at least one service type, a service type that needs to resume the collection and/or resume the reporting of the QoE measurand based on the second number indicated by the indication information. For example, the network device may configure different priorities for different service types. When it is necessary to suspend and/or resume the QoE measurand collection of a service type due to the need of tight air interface transmission resources, the network device sends a suspend/resume instruction (i.e., the indication information) to suspend the collection and/or reporting of the QoE measurand corresponding to the service types with lower priority or resume the collection and/or reporting of the QoE measurand corresponding to the service types with higher priority. Based on this scheme, the network device may only need to indicate the number of service types that need the suspending or resuming.

In some embodiments, S220 may include:

based on the second number and at least one service type priority corresponding to the at least one service type, resuming the collection of, and/or resuming the reporting of the QoE measurand corresponding to the second number of service types with higher priorities in the at least one service type.

In other words, based on the first number, the terminal device suspends collecting or suspends reporting of the QoE measurand corresponding to the first number of service types with lower priorities in the at least one service type.

In some embodiments, S220 may include:

based on the second number and at least one service type priority corresponding to the at least one service type, resuming the collection of, and/or resuming the reporting of the QoE measurand corresponding to the second number of service types with higher priorities in the at least one service type.

In other words, based on the second number, the terminal device resumes collecting or resumes reporting of the QoE measurand corresponding to the second number of service types with higher priorities in the at least one service type.

In some embodiments, the method 200 may further include following content.

In some embodiments, the priority information includes the at least one service type priority corresponding to the at least one service type.

In some embodiments, the priority information is carried in an RRC signaling or a MAC CE.

In some embodiments, the method 200 may further include:

receiving at least one configuration information sent by the network device, where the at least one configuration information is used for configuring information required for the collection and/or the reporting of the QoE measurand corresponding to the at least one service type.

In some embodiments, the at least one configuration information includes at least one index corresponding to the at least one service type.

In other words, the network device may need to explicitly add an index for the service type.

In some embodiments, the method 200 may further include:

determining at least one index corresponding to the at least one service type based on a receiving order of at least one signaling respectively containing the at least one configuration information.

In other words, the network device may need to implicitly add an index for the service type. That is, the sending order (sequence) of the at least one signaling respectively including the at least one configuration information is used for determining the at least one index corresponding to the at least one service type. The terminal device and/or the network device may determine the indexes of different service types according to the time sequence relationship of receiving the RRC signaling containing the QoE collection configurations for different service types. For example, the terminal device may determine the serial number of the service type in the chronological order as its index.

In some embodiments, each configuration information in the at least one configuration information is QoE measurement configuration information in the RRCConnectionReconfiguration IE. For example, the network device may use the RRCConnectionReconfiguration signaling to send QoE measurement configuration information to the terminal device. In some embodiments, the otherConfig IE in the QoE measurement configuration information element (RRCConnectionReconfiguration IE) includes the QoE measurement configuration information, and the QoE measurement configuration information includes the following information: index, service type and QMC configuration file.

In some embodiments, the QoE measurement configuration information includes a service type and a configuration file corresponding to the service type.

In some embodiments, the at least one service type includes at least one of following items: MBMS, streaming media service, or MTSI.

FIG. 3 is a schematic flowchart of a wireless communication method 300 according to some embodiments of this application. The method 300 may be implemented interactively by a terminal device and a network device. The terminal device shown in FIG. 3 may be the terminal device shown in FIG. 1, and the network device shown in FIG. 3 may be the access network device shown in FIG. 1. The terminal device shown in FIG. 3 supports the collection of QoE measurand corresponding to at least one service type.

As shown in FIG. 3, the method 300 may include following content.

In S310, at least one configuration information sent by the network device is received, where the at least one configuration information is used for configuring information required for collection and/or reporting of QoE measurand corresponding to at least one service type supported by the terminal device.

In some embodiments, the at least one configuration information includes at least one index corresponding to the at least one service type.

In other words, the network device may need to explicitly add an index for the service type.

In some embodiments, the method 200 may further include:

determining at least one index corresponding to the at least one service type based on a receiving order of at least one signaling respectively containing the at least one configuration information.

In other words, the network device may need to implicitly add an index for the service type. That is, the sending order (sequence) of the at least one signaling respectively including the at least one configuration information is used for determining the at least one index corresponding to the at least one service type. The terminal device and/or the network device may determine the indexes of different service types according to the time sequence relationship of receiving the RRC signaling containing the QoE collection configurations for different service types. For example, the terminal device may determine the serial number of the service type in the chronological order as its index.

In some embodiments, each configuration information in the at least one configuration information is QoE measurement configuration information in the RRCConnectionReconfiguration IE. For example, the network device may use the RRCConnectionReconfiguration signaling to send QoE measurement configuration information to the terminal device. In some embodiments, the otherConfig IE in the QoE measurement configuration information element (RRCConnectionReconfiguration IE) includes the QoE measurement configuration information, and the QoE measurement configuration information includes the following information: index, service type and QMC configuration file.

In some embodiments, the QoE measurement configuration information includes a service type and a configuration file corresponding to the service type.

Some preferred embodiments of this application have been described in detail above with reference to the accompanying drawings. However, this application is not limited to the specific details of the forgoing embodiments. Within the scope of the technical concept of this application, various simple modifications can be made to the technical solutions of this application, which shall fall within the protection scope of this application. For example, the specific technical features described in the forgoing specific embodiments may be combined in any suitable manner unless they are inconsistent. In order to avoid unnecessary repetition, this application does not describe any possible combination. For another example, the various embodiments of this application may also be combined arbitrarily, as long as they do not violate the concept of this application, they should also be regarded as the content disclosed in this application.

It should also be understood that, in the various method embodiments of this application, the size of the sequence numbers of the forgoing steps does not mean the execution sequence thereof, while the execution sequence of each step should be determined by its function and internal logic, and shall constitute no limitation on the implementation processes according to some embodiments of this application. In addition, in some embodiments of this application, the terms "downlink" and "uplink" are used for indicating the transmission direction of signals or data, where "downlink" is used for indicating that the transmission direction of signals or data is a first direction from a site to the user equipment of a cell, and "uplink" is used for indicating that the transmission direction of the signals or data is a second direction from the user equipment of the cell to the site. For example, "downlink signal" indicates that the transmission direction of the signal is the first direction. In addition, in some embodiments of this application, the term "and/or" is only used for describing an association relationship of associated objects, indicating that there may be three kinds of relationships. For example, A and/or B may mean following three cases: A exists alone, both A and B exist, and B exist alone. In addition, the character "/" in this document generally indicates that the related objects are in an "or" relationship.

The method embodiments of this application are described in detail above with reference to FIG. 1 to FIG. 3, and the apparatus embodiments of this application will be described in detail below with reference to FIG. 4 to FIG. 9.

FIG. 4 is a schematic block diagram of a terminal device 410 according to some embodiments of this application. The terminal device 410 supports the collection of QoE measurand corresponding to at least one service type.

As shown in FIG. 4, the terminal device 410 may include following content.

A receiving unit 411 is configured to receive indication information sent by the network device;

A measurement unit 412 is configured to suspend the collection, suspend the reporting, resume the collection, or resume the reporting of the QoE measurand corresponding to the at least one service type based on the indication information.

In some embodiments, the indication information is used for indicating a service type that needs suspending the collection of, suspending the reporting of, resuming the collection of, or resuming the reporting of the QoE measurand.

In some embodiments, the indication information is carried in an RRC signaling.

In some embodiments, the indication information includes a first identifier, and the first identifier is used for indicating to suspend the collection and/or to suspend the reporting, or the first identifier is used for indicating to resume the collection and/or to resume the reporting.

In some embodiments, the indication information further includes related information of the at least one service type.

In some embodiments, the related information of the at least one service type includes at least one index corresponding to the at least one service type.

In some embodiments, the at least one index corresponding to the at least one service type is pre-configured or network-configured.

In some embodiments, the indication information is carried in an RRC signaling or a MAC CE.

In some embodiments, the indication information is a bitmap, and one bit in the bitmap corresponds to one service type in the at least one service type, or one bit in the bitmap corresponds to an index of one service type in the at least one service type.

In some embodiments, when a value of the one bit is a first value, the value of the one bit is used for indicating to suspend the collection and/or suspend the reporting of QoE measurand corresponding to the one service type; or, when a value of the indication information is a second value, the value of the one bit is used for indicating to resume the collection or resume the reporting of the QoE measurand corresponding to the one service type.

In some embodiments, when a value of the one bit is a first value, the value of the one bit is used for indicating to switch a collection state and/or a reporting state of the one service type; or, when the value of the one bit is a second value, the value of the one bit is used for indicating not to switch the collection state and/or the reporting state of the one service type.

In some embodiments, the bitmap includes a bit(s) corresponding to the at least one service type.

In some embodiments, the indication information is used for indicating a first number of service types for which collection and/or reporting of the QoE measurand needs to be suspended, and/or the indication information is used for indicating a second number of service types for which collection and/or reporting of the QoE measurand needs to be resumed.

In some embodiments, the measurement unit 412 is specifically configured to: based on the second number and at least one service type priority corresponding to the at least one service type, resume the collection of, and/or resume the reporting of the QoE measurand corresponding to the second number of service types with higher priorities in the at least one service type.

In some embodiments, the measurement unit 412 is specifically configured to: based on the second number and at least one service type priority corresponding to the at least one service type, resume the collection of, and/or resume the reporting of the QoE measurand corresponding to the second number of service types with higher priorities in the at least one service type.

In some embodiments, the receiving unit 411 is further configured to:

receive priority information sent by the network device, wherein the priority information comprises the at least one service type priority corresponding to the at least one service type.

In some embodiments, the priority information is carried in an RRC signaling or a MAC CE.

In some embodiments, the receiving unit 411 is further configured to:

receive at least one configuration information sent by the network device, wherein the at least one configuration information is used for configuring information required for the collection and/or the reporting of the QoE measurand corresponding to the at least one service type.

In some embodiments, the at least one configuration information includes at least one index corresponding to the at least one service type.

In some embodiments, the receiving unit 411 is further configured to:

determine at least one index corresponding to the at least one service type based on a receiving order of at least one signaling respectively containing the at least one configuration information.

In some embodiments, each configuration information of the at least one configuration information is QoE measurement configuration information in an RRCConnectionReconfiguration IE.

In some embodiments, the QoE measurement configuration information includes a service type and a configuration file corresponding to the service type.

In some embodiments, the at least one service type includes at least one of: MBMS, streaming media service, or MTSI.

FIG. 5 is a schematic block diagram of a network device 420 according to some embodiments of this application.

As shown in FIG. 5, the network device 420 may include following content.

A sending unit 421 is configured to send indication information to the terminal device, where the indication information is configured for the terminal device to suspend collection of, suspend reporting of, resume the collection of, or resume the reporting of QoE measurand corresponding to at least one service type.

In some embodiments, the indication information is used for indicating a service type that needs suspending the collection of, suspending the reporting of, resuming the collection of, or resuming the reporting of the QoE measurand.

In some embodiments, the indication information is carried in an RRC signaling.

In some embodiments, the indication information includes a first identifier, and the first identifier is used for indicating to suspend the collection and/or to suspend the reporting, or the first identifier is used for indicating to resume the collection and/or to resume the reporting.

In some embodiments, the indication information further includes related information of the at least one service type.

In some embodiments, the related information of the at least one service type includes at least one index corresponding to the at least one service type.

In some embodiments, the at least one index corresponding to the at least one service type is pre-configured or network-configured.

In some embodiments, the indication information is carried in an RRC signaling or a MAC CE.

In some embodiments, the indication information is a bitmap, and one bit in the bitmap corresponds to one service type in the at least one service type, or one bit in the bitmap corresponds to an index of one service type in the at least one service type.

In some embodiments, when a value of the one bit is a first value, the value of the one bit is used for indicating to suspend the collection and/or suspend the reporting of QoE measurand corresponding to the one service type; or, when a value of the indication information is a second value, the value of the one bit is used for indicating to resume the collection or resume the reporting of the QoE measurand corresponding to the one service type.

In some embodiments, when a value of the one bit is a first value, the value of the one bit is used for indicating to switch a collection state and/or a reporting state of the one service type; or, when the value of the one bit is a second value, the value of the one bit is used for indicating not to switch the collection state and/or the reporting state of the one service type.

In some embodiments, the bitmap includes a bit(s) corresponding to the at least one service type.

In some embodiments, the indication information is used for indicating a first number of service types for which collection and/or reporting of the QoE measurand needs to be suspended, and/or the indication information is used for indicating a second number of service types for which collection and/or reporting of the QoE measurand needs to be resumed.

In some embodiments, the service types, for which the collection and/or the reporting needs to be suspended, in the at least one service type include the first number of service types with lower priorities in the at least one service type.

In some embodiments, the service types, for which the collection and/or the reporting needs to be resumed, in the at least one service type include the second number of service types with higher priorities in the at least one service type.

In some embodiments, the sending unit 421 is further configured to:

send priority information to the terminal device, where the priority information includes at least one service type priority corresponding to the at least one service type.

In some embodiments, the priority information is carried in an RRC signaling or a MAC CE.

In some embodiments, the sending unit 421 is further configured to:

send at least one configuration information to the terminal device, where the at least one configuration information is used for configuring information required for the collection and/or the reporting of the QoE measurand corresponding to the at least one service type, respectively.

In some embodiments, the at least one configuration information includes at least one index corresponding to the at least one service type.

In some embodiments, a sending order of at least one signaling respectively containing the at least one configuration information is used for determining at least one index corresponding to the at least one service typ.

In some embodiments, each configuration information of the at least one configuration information is QoE measurement configuration information in an RRCConnectionReconfiguration IE.

In some embodiments, the QoE measurement configuration information includes a service type and a configuration file corresponding to the service type.

In some embodiments, the at least one service type includes at least one of: MBMS, streaming media service, or MTSI.

FIG. 6 is a schematic block diagram of a terminal device 430 according to some embodiments of this application.

As shown in FIG. 6, the terminal device 430 may include following content.

A receiving unit 431 is configured to receive at least one configuration information sent by the network device, where the at least one configuration information is used for configuring information required for collection and/or reporting of QoE measurand corresponding to at least one service type supported by a terminal device.

In some embodiments, the at least one configuration information includes at least one index corresponding to the at least one service type.

In some embodiments, the receiving unit 431 is further configured to:

determine at least one index corresponding to the at least one service type based on a receiving order of at least one signaling respectively containing the at least one configuration information.

FIG. 7 is a schematic block diagram of a network device 440 according to some embodiments of this application.

As shown in FIG. 7, the network device 440 may include following content.

A sending unit 441 is configured to send at least one configuration information to the terminal device, where the at least one configuration information is used for configuring information required for collection and/or reporting of QoE measurand corresponding to at least one service type supported by the terminal device.

In some embodiments, the at least one configuration information includes at least one index corresponding to the at least one service type.

In some embodiments, a sending order of at least one signaling respectively containing the at least one configuration information is used for determining at least one index corresponding to the at least one service type.

It should be understood that the apparatus embodiments and the method embodiments may correspond to each other, and similar descriptions may refer to the method embodiments. Specifically, both the terminal device 410 shown in FIG. 4 and the terminal device 430 shown in FIG. 6 may correspond to the corresponding subjects configured to implement the methods 200 and 300 according to some embodiments of this application, and the aforementioned and other operations and/or function of the respective units therein may be performed to implement the corresponding processes in the methods 200 and 300, respectively. The network device 420 shown in FIG. 5 and the network device 440 shown in FIG. 7 may correspond to the corresponding subjects configured to implement the methods 200 and 300 according to some embodiments of this application, and the aforementioned and other operations and/or function of the respective units therein may be performed to implement the corresponding processes in the methods 200 and 300, respectively, which will not be repeated here.

The communication device according to some embodiments of this application is described above from the perspective of functional modules with reference to the accompanying drawings. It should be understood that the functional modules may be implemented in the form of hardware, and may also be implemented by instructions in the form of software, and may also be implemented by a combination of hardware and software modules.

Specifically, the steps of the method embodiments according to some embodiments of this application may be completed by hardware integrated logic circuits in the processor and/or instructions in the form of software, and the steps of the methods disclosed in conjunction with some embodiments of this application may be directly embodied as executed and completed by a hardware decoding processor, or executed and completed by a combination of hardware and software modules in the decoding processor.

Optionally, the software modules may be located in random access memory, flash memory, read-only memory, programmable read-only memory, electrically erasable programmable memory, registers, and other storage medium mature in the art. The storage medium is located in the memory, and the processor reads the information in the memory, and completes the steps in the above method embodiments in combination with its hardware.

For example, the processing unit and the communication unit referred to above may be implemented by a processor and a transceiver, respectively.

Figure 8:
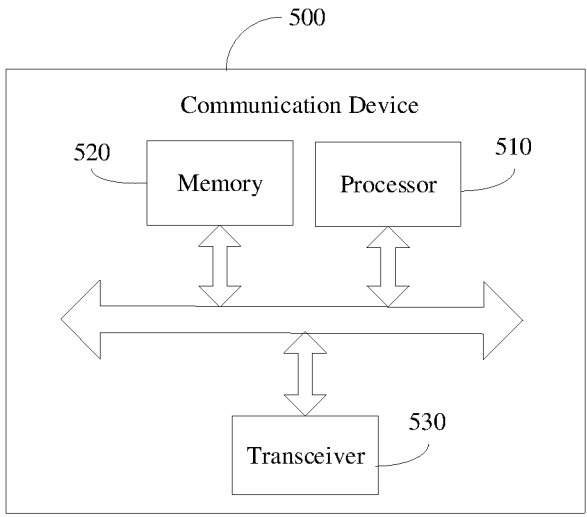
FIG. 8 is a schematic block diagram of a communication device according to some embodiments of this application.

FIG. 8 is a schematic block diagram of a communication device 500 according to some embodiments of this application.

As shown in FIG. 8, the communication device 500 may include a processor 510.

The processor 510 may call and run a computer program from a memory to implement the methods according to some embodiments of this application.

Referring to FIG. 8, the communication device 500 may further include a memory 520.

In some embodiments, the memory 520 may be configured to store instruction information, and may also be configured to store codes, instructions, and the like executed by the processor 510. The processor 510 may call and run a computer program from the memory 520 to implement the methods according to some embodiments of this application. The memory 520 may be a separate device independent of the processor 510, or may be integrated in the processor 510.

Referring to FIG. 8, the communication device 500 may further include a transceiver 530.

The processor 510 may control the transceiver 530 to communicate with other devices, specifically, may send information or data to other devices, or receive information or data sent by other devices. Transceiver 530 may include a transmitter and a receiver. The transceiver 530 may further include antennas, and the number of the antennas may be one or more.

It should be understood that each component in the communication device 500 is connected through a bus system, where the bus system includes a power bus, a control bus and a status signal bus in addition to a data bus.

It should also be understood that the communication device 500 may be a terminal device according to some embodiments of this application, and the communication device 500 may implement the corresponding processes implemented by the terminal device in each method according to some embodiments of this application. The communication device 500 may correspond to the terminal device 410 or the terminal device 430 according to some embodiments of this application, and may correspond to the corresponding subject configured to implement the method 200 and the method 300 according to some embodiment of this application, which is not repeated here for brevity. Similarly, the communication device 500 may be the network device according to some embodiments of this application, and the communication device 500 may implement corresponding processes implemented by the network device in each method according to some embodiments of this application. In other words, the communication device 500 according to some embodiments of this application may correspond to the network device 420 and the network device 440 according to some embodiments of this application, and may correspond to the corresponding subject configured to implement the method 200 and the method 300 according to some embodiment of this application, For brevity, details are not repeated here.

In addition, some embodiments of this application also provide a chip.

For example, the chip may be an integrated circuit chip, which has a signal processing capability, and can implement or execute the methods, steps, and logic block diagrams disclosed in some embodiments of this application. The chip may also be referred to as a system-level chip, a chip system, a system chip, or a system-on-a-chip, or the like. Optionally, the chip can be applied to various communication devices, so that the communication device installed with the chip can implement the methods, steps and logic block diagrams disclosed in some embodiments of this application.

Figure 9:
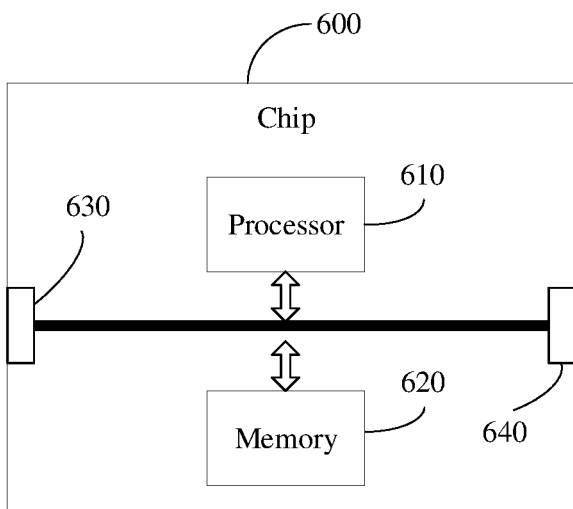
FIG. 9 is a schematic block diagram of a chip according to some embodiments of this application.

FIG. 9 is a schematic block diagram of a chip 600 according to some embodiments of this application.

As shown in FIG. 9, the chip 600 includes a processor 610.

The processor 610 may call and run a computer program from a memory to implement the methods according to some embodiments of this application.

Referring to FIG. 9, the chip 600 may further include a memory 620.

The processor 610 may call and run a computer program from the memory 620 to implement the methods according to some embodiments of this application. The memory 620 may be configured to store instruction information, and may also be configured to store codes, instructions and the like executed by the processor 610. The memory 620 may be a separate device independent of the processor 610, or may be integrated in the processor 610.

Referring to FIG. 9, the chip 600 may further include an input interface 630.

The processor 610 may control the input interface 630 to communicate with other devices or chips, and specifically, may acquire information or data sent by other devices or chips.

Referring to FIG. 9, the chip 600 may further include an output interface 640.

The processor 610 may control the output interface 640 to communicate with other devices or chips, and specifically, may output information or data to other devices or chips.

It should be understood that the chip 600 may be applied to the network device according to some embodiments of this application. The chip may implement the corresponding processes implemented by the network device in the various methods according to some embodiments of this application, and may also implement the corresponding processes implemented by the terminal device in the various methods according to some embodiments of this application. For brevity, details are not repeated here.

It should also be understood that various components in the chip 600 are connected through a bus system, where the bus system includes a power bus, a control bus and a status signal bus in addition to a data bus.

The processors referred to above may include, but are not limited to:

a general-purpose processor, a Digital Signal Processor (DSP), an Application Specific Integrated Circuit (ASIC), a Field Programmable Gate Array (FPGA) or other programmable logic devices, discrete gates, a transistor logic device, a discrete hardware component, and so on.

The processor may be configured to implement or execute the methods, steps, and logical block diagrams disclosed in some embodiments of this application. The steps of the method disclosed in conjunction with some embodiments of this application may be directly embodied as executed by a hardware decoding processor, or executed by a combination of hardware and software modules in the decoding processor. The software module may be located in random access memory, flash memory, read-only memory, programmable read-only memory or erasable programmable memory, registers and other storage medium mature in the art. The storage medium is located in the memory, and the processor reads the information in the memory, and completes the steps of the above method in combination with its hardware.

The memory mentioned above includes but is not limited to:

a volatile memory and/or a non-volatile memory. In some embodiments, the non-volatile memory may include a Read-Only Memory (ROM), a Programmable ROM (PROM), an Erasable PROM (EPROM), an Electrically EPROM (EEPROM) or flash memory. The volatile memory may include a Random Access Memory (RAM), which acts as an external cache. By way of illustration without limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), synch link DRAM (SLDRAM) and Direct Rambus RAM (DR RAM).

It should be noted that the memory described herein is intended to include these and any other suitable types of memory.

Embodiments of this application also provide a computer-readable storage medium for storing a computer program. The computer-readable storage medium stores one or more programs including instructions that, when executed by a portable electronic device including a plurality of application programs, enable the portable electronic device to perform methods 200 and 300 according to some embodiments as described.

Optionally, the computer-readable storage medium may be applied to the network device according to some embodiments of this application, and the computer program enables the computer to execute the corresponding processes implemented by the network device in the various methods according to some embodiments of this application. For brevity, details are not repeated here.

Optionally, the computer-readable storage medium may be applied to the mobile terminal/terminal device according to some embodiments of this application, and the computer program enables the computer to execute the corresponding processes implemented by the mobile terminal/terminal device in the various methods according to some embodiments of this application. For brevity, details are not repeated here.

Some embodiments of this application also provide a computer program product, including a computer program.

Optionally, the computer program product may be applied to the network device according to some embodiments of this application, and the computer program enables the computer to execute the corresponding processes implemented by the network device according to some embodiments of this application. For brevity, details are not repeated here.

Optionally, the computer program product can be applied to the mobile terminal/terminal device according to some embodiments of this application, and the computer program enables the computer to execute the corresponding processes implemented by the mobile terminal/terminal device according to some embodiments of this application. For brevity, details are not repeated here.

A computer program is also provided in some embodiments of this application. When the computer program is executed by a computer, it enables the computer to perform the methods 200 and 300 according to some embodiments.

Optionally, the computer program may be applied to the network device according to some embodiments of this application. When the computer program is run on the computer, it causes the computer to execute the corresponding processes implemented by the network device in each method according to some embodiments of this application. For the sake of brevity, details will not be repeated here.

In addition, some embodiments of this application further provides a communication system, which may include the forgoing terminal device and network device to form a communication system 100 as shown in FIG. 1, which is not repeated here for brevity. It should be noted that the terms "system" and the like in this document may also be referred to as "network management architecture" or "network system" and the like.

It should also be understood that the terms used in the embodiments of this application and the appended claims are only for the purpose of describing specific embodiments, and are not intended to limit the embodiments of this application.

For example, as used in some embodiments of this application and the appended claims, the singular forms "a," "the," "above," and "said" are intended to include the plural forms as well, unless the context clearly dictates otherwise.

Those skilled in the art can realize that the units and algorithm steps of each example described in conjunction with some embodiments disclosed herein can be implemented in electronic hardware, or a combination of computer software and electronic hardware. Whether these functions are performed in hardware or software depends on the specific application and design constraints of the technical solution. Experts may use different methods for each specific application to implement the described functions, but such implementation should not be considered beyond the scope of the embodiments of this application.

If implemented in the form of a software functional unit and sold or used as a stand-alone product, it may be stored in a computer-readable storage medium. Based on this understanding, the technical solutions of the embodiments of this application in essence, or the parts thereof that make contributions to the prior art, or the parts of the technical solutions may be embodied in the form of software products, and the computer software products are stored in a storage medium, including several instructions for causing a computer device (which may be a personal computer, a server, or a network device, etc.) to execute all or part of the steps of the methods described in the embodiments of this application. The aforementioned storage medium includes a U disk, a removable hard disk, a read-only memory, a random access memory, a magnetic disk, an optical disk, or other medium that can store program codes.

Those skilled in the art can clearly understand that, for the convenience and brevity of description, the specific working process of the above-described systems, devices and units may refer to the corresponding processes in the foregoing method embodiments, which will not be repeated here.

In the several embodiments provided in this application, it should be understood that the disclosed systems, devices and methods may be implemented in other manners.

For example, the division of units, modules or components in the apparatus embodiments described above is only a logical function division, and other division manners may be used in actual implementation. For example, multiple units, modules or components may be combined or integrated to another system, or some units or modules or components may be ignored or not implemented.

For another example, the forgoing units/modules/components described as separate/illustrated components may or may not be physically separated, that is, may be located in one place, or may be distributed to multiple network units. Some or all of the units/modules/components may be selected according to actual needs to achieve the purpose of the embodiments of this application.

Finally, it should be noted that the mutual coupling or direct coupling or communication connection shown or discussed above may be through some interfaces, indirect coupling or communication connection of devices or units, which may be electrical, mechanical or in other forms.

The above content is only the specific implementation of some embodiment of this application, but the protection scope of the embodiments of this application is not limited thereto. Those skilled in the art can easily think of any changes or substitutions thereof, which shall fall within the protection scope of the embodiments of this application. Therefore, the protection scope of the embodiments of this application should be determined by the protection scope of the claims.

What is claimed is:

1. A wireless communication method applied to a terminal device, wherein the terminal device supports collection of QoE measurand corresponding to multiple service types, and the method comprises:

receiving indication information sent by a network device; and based on the indication information, suspending the collection of, suspending reporting of, resuming the collection of, or resuming the reporting of the QoE measurand corresponding to the multiple service types, wherein the indication information is used for indicating a first number of service types for which collection and/or reporting of the QoE measurand needs to be suspended, and based on the indication information, suspending the collection of, suspending reporting of, resuming the collection of, or resuming the reporting of the QoE measurand corresponding to the multiple service types comprises: based on the first number and at least one different service type priority priorities corresponding to the multiple service types, suspending the collection of, and/or suspending the reporting of the QoE measurand corresponding to the first number of service types with lower priorities than remaining service types in the multiple service types in the at least one service type; or the indication information is used for indicating a second number of service types for which collection and/or reporting of the QoE measurand needs to be resumed, and based on the indication information, suspending the collection of, suspending reporting of, resuming the collection of, or resuming the reporting of the QoE measurand corresponding to the multiple service types comprises: based on the second number and different service type priorities corresponding to the multiple service types, resuming the collection of, and/or resuming the reporting of the QoE measurand corresponding to the second number of service types with higher priorities than remaining service types in the multiple service types.

2. The method according to claim 1, further comprising:
receiving priority information sent by the network device, wherein the priority information comprises the different service type priorities corresponding to the multiple service types.

3. The method according to claim 2, wherein the priority information is carried in an RRC signaling or a MAC CE.

4. The method according to claim 1, further comprising:
receiving at least one configuration information sent by the network device, wherein the at least one configuration information is used for configuring information required for the collection and/or the reporting of the QoE measurand corresponding to the multiple service types.

5. The method according to claim 4, wherein the at least one configuration information comprises multiple indexes corresponding to the multiple service types.

6. The method according to claim 4, further comprising:
determining multiple indexes corresponding to the multiple service types based on a receiving order of multiple pieces of signaling respectively containing the at least one configuration information.

7. The method according to claim 4, wherein each configuration information of the at least one configuration information is QoE measurement configuration information in an RRCConnectionReconfiguration information element, IE.

8. A wireless communication method, being applied to a network device and comprising:
sending indication information to a terminal device, wherein the indication information is configured for the terminal device to suspend collection of, suspend reporting of, resume the collection of, or resume the reporting of QoE measurand corresponding to multiple service types,
wherein the indication information is used for indicating a first number of service types for which collection and/or reporting of the QoE measurand needs to be suspended, and the service types, for which the collection and/or the reporting needs to be suspended, in the multiple service types comprise the first number of service types with lower priorities than remaining service types in the multiple service types; or
the indication information is used for indicating a second number of service types for which collection and/or reporting of the QoE measurand needs to be resumed, and the service types, for which the collection and/or the reporting needs to be resumed, in the multiple service types comprise the second number of service types with higher priorities than remaining service types in the multiple service types.

9. The method according to claim 8, further comprising:
sending priority information to the terminal device, wherein the priority information comprises different service type priorities corresponding to the multiple service types.

10. The method according to claim 8, further comprising:
sending at least one configuration information to the terminal device, wherein the at least one configuration information is used for configuring information required for the collection and/or the reporting of the QoE measurand corresponding to the multiple service types.

11. The method according to claim 10, wherein the at least one configuration information comprises multiple indexes corresponding to the multiple service types; or
wherein a sending order of multiple pieces of signaling respectively containing the at least one configuration information is used for determining multiple indexes corresponding to the multiple service types.

12. The method according to claim 10, wherein each configuration information of the at least one configuration information is QoE measurement configuration information in an RRCConnectionReconfiguration information element (IE).

13. The method according to claim 10, wherein the QoE measurement configuration information comprises a service type and a configuration file corresponding to the service type.

14. The method according to claim 8, wherein the multiple service types comprise at least one of following: a multimedia broadcast multicast service (MBMS), a streaming media service, or Multimedia Telephony Services for Internet protocol multimedia subsystem (MTSI).

15. A terminal device, supporting collection of QoE measurand corresponding to multiple service types and comprising:
a processor, a transceiver and a memory, wherein the memory is configured to store a computer program, and the processor, through invoking and executing the computer program stored in the memory, is configured to:
receive, through the transceiver, indication information sent by a network device; and
based on the indication information, suspend the collection of, suspend reporting of, resume the collection of, or resume the reporting of the QoE measurand corresponding to the multiple service types,
wherein the indication information is used for indicating a first number of service types for which collection and/or reporting of the QoE measurand needs to be suspended, and based on the indication information, suspending the collection of, suspending reporting of, resuming the collection of, or resuming the reporting of the QoE measurand corresponding to the multiple service types comprises: based on the first number and different service type priorities corresponding to the multiple service types, suspending the collection of, and/or suspending the reporting of the QoE measurand corresponding to the first number of service types with lower priorities than remaining service types in the multiple service types; or
the indication information is used for indicating a second number of service types for which collection and/or reporting of the QoE measurand needs to be resumed, and based on the indication information, suspending the collection of, suspending reporting of, resuming the collection of, or resuming the reporting of the QoE measurand corresponding to the multiple service types comprises: based on the second number and different service type priorities corresponding to the multiple service types, resuming the collection of, and/or resuming the reporting of the QoE measurand corresponding to the second number of service types with higher priorities than remaining service types in the multiple service types'.

\* \* \* \* \*